July 18, 1967   D. R. BUERSCHINGER   3,331,287
FLUID OPERATED PISTON-TYPE ACTUATOR
Filed May 27, 1964
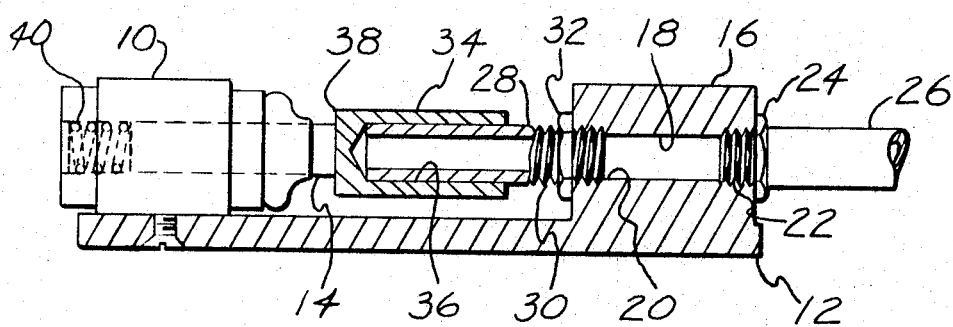
INVENTOR:
DONALD R. BUERSCHINGER
BY  RONALD C. KAMP
ATTORNEY 3,331,287
FLUID OPERATED PISTON-TYPE ACTUATOR
Donald R. Buerschinger, Peoria, Ill., assignor to LeTourneau-Westinghouse Company, Peoria, Ill., a corporation of Illinois
Filed May 27, 1964, Ser. No. 370,421
5 Claims. (Cl. 91—52)

The present invention relates generally to contactor or valve actuators and more particularly to such actuators which are operated by pneumatic pressure.

Electric or hydraulic motors have long been utilized to actuate various components on a machine, e.g., the ejector gate on an earth scraper. Often these motors are physically located at positions remote from the machine operator. It has been found to be convenient for a variety of reasons to locate the contactor or valve on, or in close proximity to, the motor to be controlled thereby. One of the reasons for locating the contactor or valve near the motor itself rather than near the machine operator is that the source of electric or hydraulic power is often closer to the motor than it is to the operator. Another reason is that the control lever manipulated by the operator must accomplish a multitude of functions which may be performed by a variety of motor types operating on different currents and at different voltages, or the control lever may have to control a variety of system types, e.g., electric, hydraulic and pneumatic. Whatever the reason for mounting a contactor or valve at a remote position, an actuator must be provided to relay the command from the operator to the contactor or valve. Since the contactor or valve is often actuated quite frequently and for very short periods or durations of time, the actuator itself must be capable of withstanding a multitude of cycles without failure or loss of dependability, and must respond to the command signal to engage and disengage instantaneously.

It is, therefore, an object of the present invention to provide an actuator which is capable of withstanding an indefinite number of cycles, which is highly dependable, and which is instantaneously responsive.

Other objects and many of the attendant advantages of the present invention will become apparent to those skilled in the art from a perusal of the following description and the accompanying drawing, wherein the sole figure is a side elevational view, partly in section, showing a preferred embodiment of the invention.

Referring now in detail to the embodiment shown in the drawing, a snap switch or contactor 10, which may be of the type disclosed in U.S. Patent 2,629,791, is mounted on a base member 12 with the plunger or movable element 14 of the switch disposed in a plane parallel to the plane of the base member 12. Also secured to or made integral with the base member 12 and positioned opposite the plunger 14 is a block 16 having a bore 18 therein. The bore 18 is threaded at each end as indicated by the numerals 20 and 22. A fitting 24 engages the threads 22 to secure a conduit or hose 26 to the block 16 in fluid communication with the bore 18. A hollow pipe or rod 28 is threaded at one end as indicated by the numeral 30 and is turned into engagement with the threads 20 in the bore 18. A lock nut 32 is provided on the threaded portion 30 to rigidly secure the pipe 28 to the block 16. A plunger or cup 34 having an internal blind bore 36 which is slightly larger than the external diameter of the pipe 28 is slideably received over the free end of the pipe 28. The cup 34 has a closed end 38 which is positioned in contact with the switch plunger 14. To avoid any preload on the switch 10, the pipe 28 can be rotated until the end 38 is just contacting the plunger 14 with the pipe 28 positioned against the bottom of the blind bore 36. The lock nut 32 can then be tightened to maintain this relationship.

Operation

The plunger 14 is biased by means of a spring indicated by dotted lines at 40, contained within the switch 10 outward into contact with the closed end 38. When it is desired to actuate this switch, air under pressure is directed through the hose 26 and into the bore 18. The air passes through the pipe 28 and, acting on the closed end 38 of the sleeve 34, forces the plunger to the left, as viewed in the drawing. The force exerted on the plunger is equal to the product of the cross sectional area of the bore 36 and the air pressure. Thus, the clearance between the pipe and the sleeve should not be so great that the pressure will drop below that required for the above mentioned product to exceed the bias force of the spring. Since there is a slight clearance between the pipe and bore 36, air will be expelled around the open end of the sleeve 34 and the plunger will be returned to its normal position promptly after air under pressure ceases to be directed through the conduit 26.

It has been found that by making the pipe 28 of metal and the cup 34 of either acetal or phenolic plastic, such as those sold under the trademarks Lexon, Delrin, Nylon, and Synthane, the wear characteristics were very good. For example, an actuator with the blind bore 36 having a diameter of .3888 in. and the gap, i.e., the difference between the outside diameter of the pipe 28 and the diameter of the bore 36, being .0084 in. has been cycled 3,225,000 times with the air supply to the actuator being 150 p.s.i. The wear or increase in the gap after over three million cycles was .0006 in. and the force developed at the closed end 38 decreased only half a pound.

It is apparent from the foregoing description that the present invention provides an actuator for a switch which is not only simple and inexpensive of construction but also is highly dependable, very durable and capable of instantaneous response. While variations and modifications of the embodiment shown in the drawings can be made by those skilled in the art, the present invention is to be limited only by the scope of the appended claims.

What is claimed is:

1. An actuator for operating a valve having a normal position and movable against a resilient bias into an operated position by the application of an operating force and returnable under the influence of said bias to its normal position upon removal of said force, comprising:
   a support for the valve,
   a block on the support and having a cavity,
   an open-ended pipe threadedly secured to the block and supported thereby with one open end in communication with the cavity and the other end in close proximity to the valve, threaded connecting means on said one end of said pipe and adjustably fixing said pipe to said block for longitudinal movement,
   a loosely fitting cup on the pipe having a closed end and a sleeve, the inner periphery of said sleeve loosely engaging the outer periphery of said other open end of said pipe in non-fluid sealing relationship thereto and said closed end externally contacting the valve, and
   a source of air under pressure connectable with the cavity,
   whereby the admission of air under pressure moves the cup on the pipe against the valve to operate the same and dissipation of the air under pressure between the cup and the pipe permits return of the valve under the influence of the resilient bias.

2. An actuator according to claim 1 wherein said pipe is made of metal and said cup is made of plastic.

3. In a vehicle of the type including an operator's location and an air system including a source of air under pressure for actuating components of the vehicle, air system control means positioned adjacent the operator's location for controlling distribution of air pressure in the air system, motor means for driving at least one of said components, the motor means being remotely positioned on said vehicle from the operator's location, the improvement comprising:

motor control means positioned adjacent and for controlling said motor means, said motor control means including a movable element biased to a first position, actuator means positioned adjacent and for actuating said motor control means, said actuator means including a block fixedly positioned relative to said motor control means, pipe means supported on said block, said pipe means including an outer end adjacent said movable element, said pipe means defined by an outer periphery and an inner periphery defining a bore, air conduit means connecting said bore with the air system control means, and plunger means movably positioned on said outer end of said pipe means for partially blocking said bore, said plunger means loosely contacting one of said peripheries in non-fluid-sealing relationship thereto, an outer end of said plunger means contacting said movable element whereby the admission of air under pressure to said air conduit means moves said plunger means to move said movable element away from said first position to actuate the motor means and dissipation of air under pressure between said plunger means and said one of said peripheries permits return of said plunger to said first position.

4. In a vehicle according to claim 3 wherein said plunger means further comprises a loosely fitting cup positioned about the outer periphery of said outer end of said pipe means, said cup having a closed end and a sleeve, the inner periphery of said sleeve loosely engaging the outer periphery of said pipe means in non-fluid sealing relationship thereto and said closed end externally contacting said movable element.

5. In a vehicle according to claim 4 wherein said pipe means is adjustably mounted on said block for selective longitudinal movement relative to said movable element.

References Cited
UNITED STATES PATENTS

| | | | |
|---|---|---|---|
| 1,297,288 | 3/1919 | Yarrow | 251—14 X |
| 1,622,448 | 3/1927 | Kalkbrenner | 251—62 X |
| 1,737,563 | 12/1929 | Boschert | 92—117 |
| 2,087,037 | 7/1937 | McCarthy | 137—494 |
| 2,132,978 | 10/1938 | Stewart | 92—170 |
| 2,993,472 | 7/1961 | Einsiedler | 92—117 |
| 3,029,061 | 5/1962 | Hoxworth | 251—62 |

M. CARY NELSON, *Primary Examiner.*

E. K. FEIN, *Assistant Examiner.*